(12) United States Patent
Xu (10) Patent No.: US 12,494,813 B1
(45) Date of Patent: Dec. 9, 2025

(54) MOBILE PHONE PROTECTIVE CASE WITH ROTATING SUPPORT

(71) Applicant: GOLBINBOX INC, Las Vegas, NV (US)

(72) Inventor: Mengting Xu, Yangjiang (CN)

( * ) Notice: Subject to any disclaimer, the term of this patent is extended or adjusted under 35 U.S.C. 154(b) by 0 days.

(21) Appl. No.: 18/963,916

(22) Filed: Nov. 29, 2024

(51) Int. Cl.
*H04B 1/3888* (2015.01)
*A45C 11/00* (2006.01)
*A45C 13/00* (2006.01)

(52) U.S. Cl.
CPC ............ *H04B 1/3888* (2013.01); *A45C 11/00* (2013.01); *A45C 13/005* (2013.01); *A45C 11/002* (2025.01); *A45C 2200/15* (2013.01)

(58) Field of Classification Search
CPC ... A45C 11/002; A45C 11/003; A45C 13/005; G06F 2200/1633; G06F 1/1675; G06F 1/1681; H04B 1/3888; H04M 1/0264; H04M 2250/52
See application file for complete search history.

(56) References Cited

U.S. PATENT DOCUMENTS

| | | | |
|---|---|---|---|
| 10,003,371 B1 * | 6/2018 | Given | H04M 1/0264 |
| D1,007,491 S * | 12/2023 | Weng | D14/250 |
| D1,019,621 S | 3/2024 | Feng | |
| 2024/0288949 A1 * | 8/2024 | Hoover | G06F 1/1628 |

* cited by examiner

*Primary Examiner* — Quoc Thai N Vu (57) ABSTRACT

The present invention relates to a mobile phone protective case with a rotating support, where the protective case includes a main body and a camera support assembly, the main body is provided with an accommodation cavity for accommodating a mobile phone, the camera support assembly is removably installed at a camera hole, the camera support assembly includes an installation base and a support, the support is rotationally connected to the installation base through a hinge, the support is configured to protect a camera of the mobile phone when closed, and the support is configured to support the mobile phone when opened.

9 Claims, 8 Drawing Sheets

MOBILE PHONE PROTECTIVE CASE WITH ROTATING SUPPORT

BACKGROUND

1. Technical Field

The present invention relates to the field of mobile phone protective cases, and in particular to a mobile phone protective case with a rotating support.

2. Background Information

To protect electronic products such as mobile phones and tablets from falling and being worn during use, protective cases are usually used for protection. The mobile phone protective cases can be divided into PC cases, leather cases, silicone cases, cloth cases, hard plastic cases, leather cases, metal tempered glass cases, soft plastic cases, velvet cases, silk cases, and the like according to texture. The mobile phone protective cases also provide shelter for expensive cameras as well as preventing the mobile phones from falling and being worn, to prevent lenses from being scratched or damaged. In addition, to make it easier for the mobile phones to be used upright or horizontally on a table, backs of the cases are usually equipped with supports.

Supports and cameras of existing mobile phone protective cases are usually protected by different parts, resulting in overall heavy weight of the mobile phone protective cases, leading to carrying inconvenience of the mobile phone protective cases, and also affecting the beauty of the mobile phone protective cases.

To overcome deficiencies of the prior art, the present invention is intended to provide a mobile phone protective case with a rotating support, an installation base is removably disposed at a camera hole, and a support that can be rotated and opened for support is hinged on the installation base.

BRIEF SUMMARY

The present invention provides a mobile phone protective case with a rotating support, to resolve the following problem in the prior art: a support and camera of a mobile phone protective case are usually protected by different parts, resulting in the overall heavy weight of the mobile phone protective case, leading to carrying inconvenience of the mobile phone protective case, and also affecting the beauty of the mobile phone protective case.

Technical solutions of the present invention for resolving the above technical problem are as follows. A mobile phone protective case with a rotating support is provided, where the protective case includes a main body and a camera support assembly, the main body is provided with an accommodation cavity for accommodating a mobile phone, and a camera hole is provided in the main body corresponding to a camera of the mobile phone, where the camera support assembly is removably installed at the camera hole, the camera support assembly includes an installation base and a support, the support is rotationally connected to the installation base through a hinge, the support is configured to protect the camera of the mobile phone when closed, and the support is configured to support the mobile phone when opened; and the hinge includes a pressing plate, a rotating shaft, and a sleeve, a slot is provided at one end of the support, a clamping block is disposed next to the slot, and the rotating shaft is installed in the slot after the clamping block is clamped with an opening of the pressing plate; and the sleeve is disposed on the installation base and is rotationally connected to the rotating shaft.

Preferably, a step is disposed at an end of the installation base; and the hinge further includes an installation plate, the sleeve and the installation plate are integrally formed, and the installation plate is installed on the step.

Preferably, a plurality of pins are disposed on a surface of the step, and a plurality of pin holes are provided at corresponding positions of the installation plate, and the pins fit into the pin holes; and a positioning sheet is also installed on a lower surface of the installation plate, and a lower surface of the positioning sheet is flush with a lower surface of the installation plate.

Preferably, the positioning sheet is pasted on and fastened to the lower surface of the installation plate.

Preferably, a raised strip is disposed on a side wall of the camera hole, a groove is provided at a corresponding position on a side wall of the installation base, and the raised strip is clamped with the groove.

Preferably, the raised strip and the groove are disposed in annular shapes, the raised strip is disposed around the camera hole, and the groove is disposed around the installation base.

Preferably, a plurality of lens holes are provided in the support for avoiding the camera of the mobile phone.

Preferably, there are two pressing plates and two clamping blocks, and the two pressing plates are disposed at two ends of the rotating shaft.

Preferably, the installation base and the support are both plastic parts.

Preferably, a touch button is provided on a side wall of the accommodation cavity, and the touch button is electrically connected to the mobile phone.

The mobile phone protective case provided in the present invention has the following advantages.

1. The slot is provided at the end of the support, and the cross section of the slot is disposed to be rectangle, to prevent the rotating shaft from shaking in the slot. Through movable connection between the pressing plate and the clamping block, the rotating shaft is easily connected to the support, then the rotating shaft is easily inserted into the sleeve, and finally the camera support assembly with the installation base and the support that are easily assembled is obtained. When using the mobile phone protective case, the user can purchase a plurality of camera support assemblies. When the installation base or support is damaged, a corresponding part can be replaced as needed without replacement of the entire camera support assembly. Such setting further reduces use costs for the user.

2. The raised strip is disposed on a side wall of the camera hole, the groove is provided at a corresponding position on a side wall of the installation base, the raised strip is clamped with the groove, and the installation base is installed in the camera hole, so that the camera support assembly is easily installed. The installation base is pulled upward to separate the raised strip from the groove, and then the installation base is separated from the camera hole, so that the camera support assembly can be easily removed.

The above description is only an overview of the technical solutions of the present invention. To clearly understand the technical means of the present invention and implement the technical means according to content of the description, preferred embodiments of the present invention are described in detail below with reference to the accompanying drawings. Specific implementations of the present invention are provided in the following embodiments and accompanying drawings.

BRIEF DESCRIPTION OF THE DRAWINGS

The accompanying drawings described herein are used to provide further understanding of the present invention and constitute a part of the present invention. The exemplary embodiments of the present invention and descriptions thereof are used to explain the present invention, and do not constitute an undue limitation on the present invention. In the accompanying drawings.

In the drawings, parts represented by numerals are listed as follows:
1. main body; 11. accommodation cavity; 12. camera hole; 13. raised strip; 14. touch button;
2. installation base; 21. groove; 22. step; 23. pin;
3. support; 31. clamping block; 32. slot; 33. lens hole;
4. hinge; 41. pressing plate; 42. rotating shaft; 43. sleeve; 44. installation plate; 45. positioning sheet;
T0. mobile phone.

DETAILED DESCRIPTION OF THE DRAWINGS AND THE PRESENTLY PREFERRED EMBODIMENTS

Principles and features of the present invention are described below with reference to FIG. 1 to FIG. 8, and the examples given are only used to explain the present invention and are not used to limit the scope of the present invention. The present invention is described more specifically by way of example with reference to the accompanying drawings in the following paragraphs. According to the following description and claims, advantages and features of the present invention are clearer. It should be noted that the drawings are in a very simplified form and non-precise proportions, and are only used to easily and clearly assist in explaining the purpose of embodiments of the present invention.

It should be noted that when one assembly is referred to as being "fastened to "another assembly, the assembly may be directly on the another assembly or there may be an assembly in the middle. When one assembly is considered to be "connected" to another assembly, the assembly may be directly connected to the another assembly or there may be an assembly in the middle. When one assembly is considered to be "disposed" on another assembly, the assembly may be directly disposed on the another assembly or there may be an assembly in the middle. Terms "vertical", "horizontal", "left", "right", and similar expressions used herein are for illustrative purposes only.

Unless otherwise defined, all technical and scientific terms used in this specification have same meanings as those usually understood by a person skilled in the art of the present invention. The terms used in this specification of the present invention are merely for the purpose of describing specific embodiments, and are not intended to limit the present invention. A term "and/or" in this specification includes any and all combinations of one or more of associated listed items.

EMBODIMENTS

Figure 1:
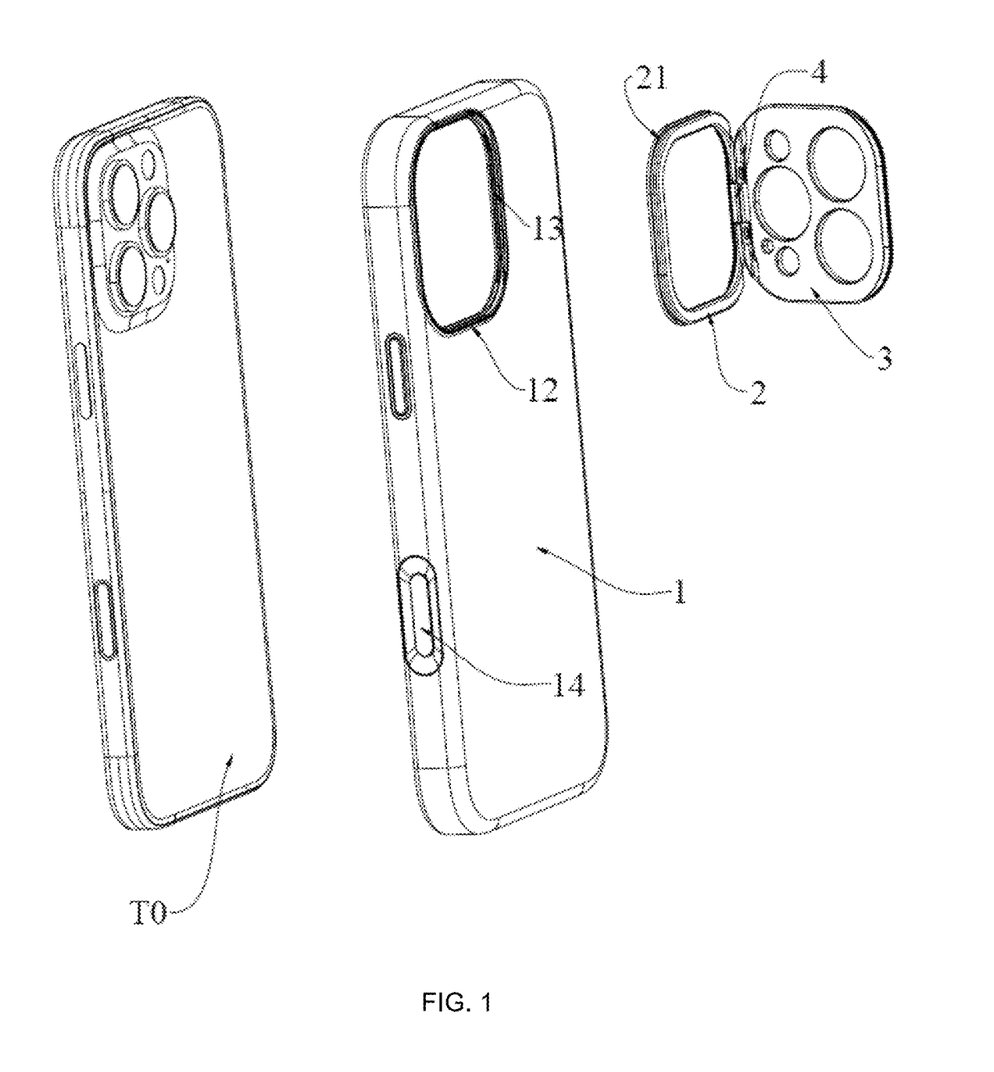
FIG. 1 is a schematic exploded view of a mobile phone protective case according to the present invention.
Figure 2:
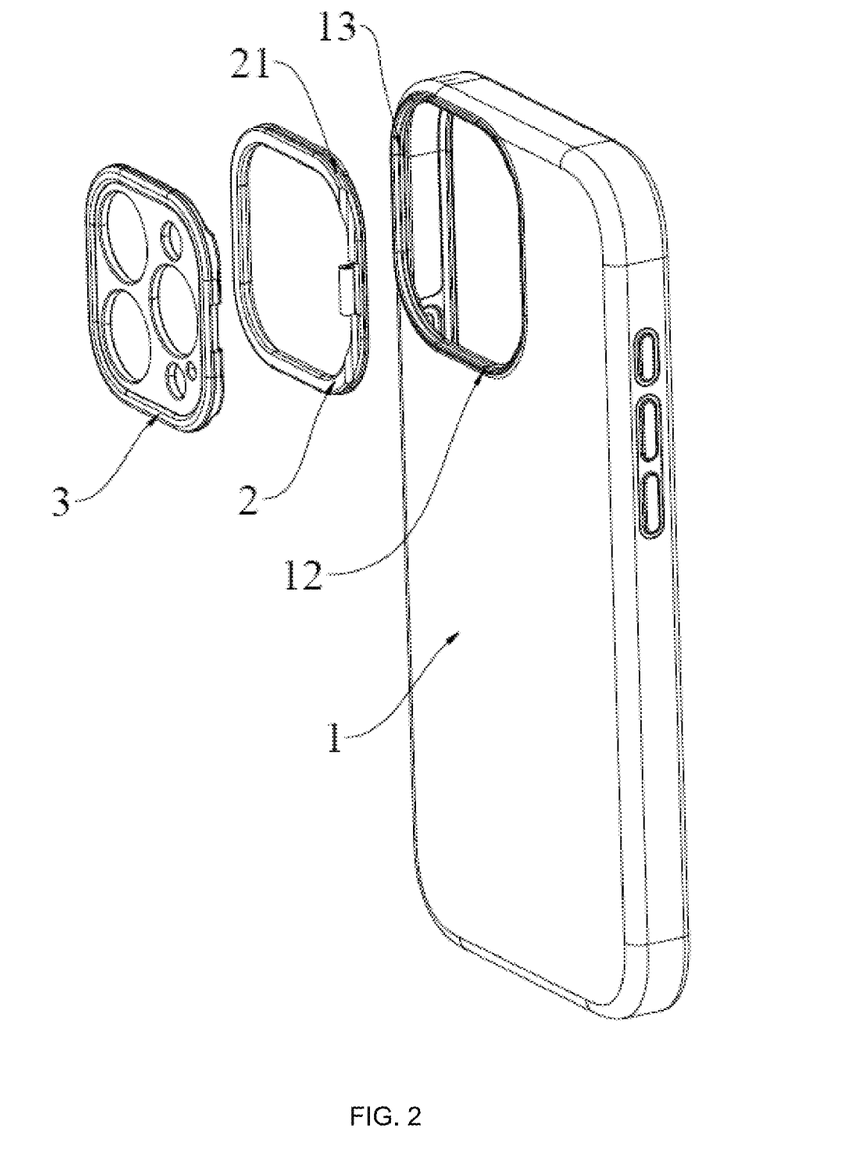
FIG. 2 is another schematic exploded view of the mobile phone protective case according to the present invention.
Figure 3:
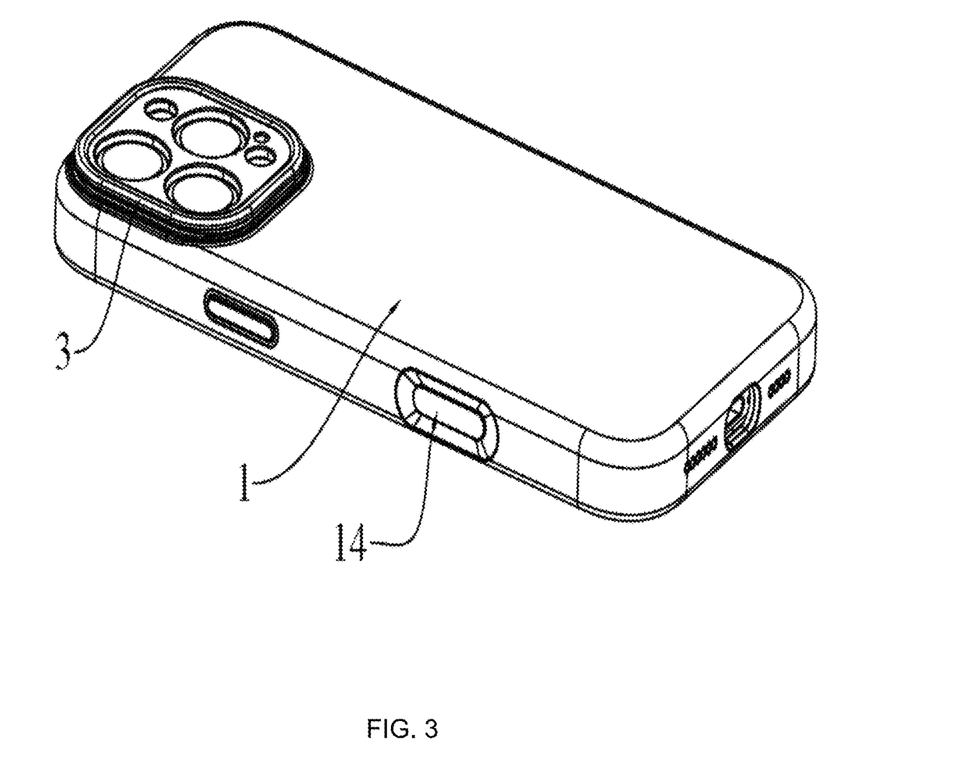
FIG. 3 is a schematic structural diagram of a support of the mobile phone protective case when closed according to the present invention.
Figure 4:
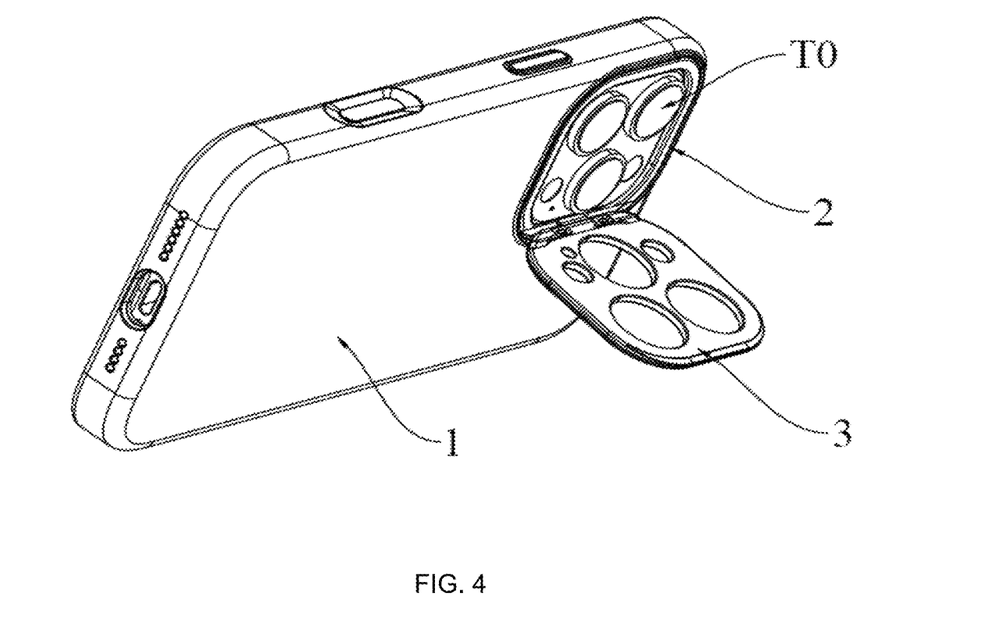
FIG. 4 is a schematic structural diagram of the support of the mobile phone protective case when opened according to the present invention.

A mobile phone protective case with a rotating support provided in an embodiment of the present invention is shown in FIG. 1 to FIG. 4. The protective case includes a main body 1 and a camera support assembly. The main body 1 is provided with an accommodation cavity 11 for accommodating a mobile phone TO. A camera hole 12 is provided in the main body 1 corresponding to a camera of the mobile phone TO. The camera support assembly is removably installed at the camera hole 12. The camera support assembly includes an installation base 2 and a support 3. The support 3 is rotationally connected to the installation base 2 through a hinge 4. The support 3 is configured to protect the camera of the mobile phone TO when closed (as shown in FIG. 3). The support 3 is configured to support the mobile phone TO when opened (as shown in FIG. 4), so that the mobile phone TO is easily and horizontally placed on a table.

Figure 5:
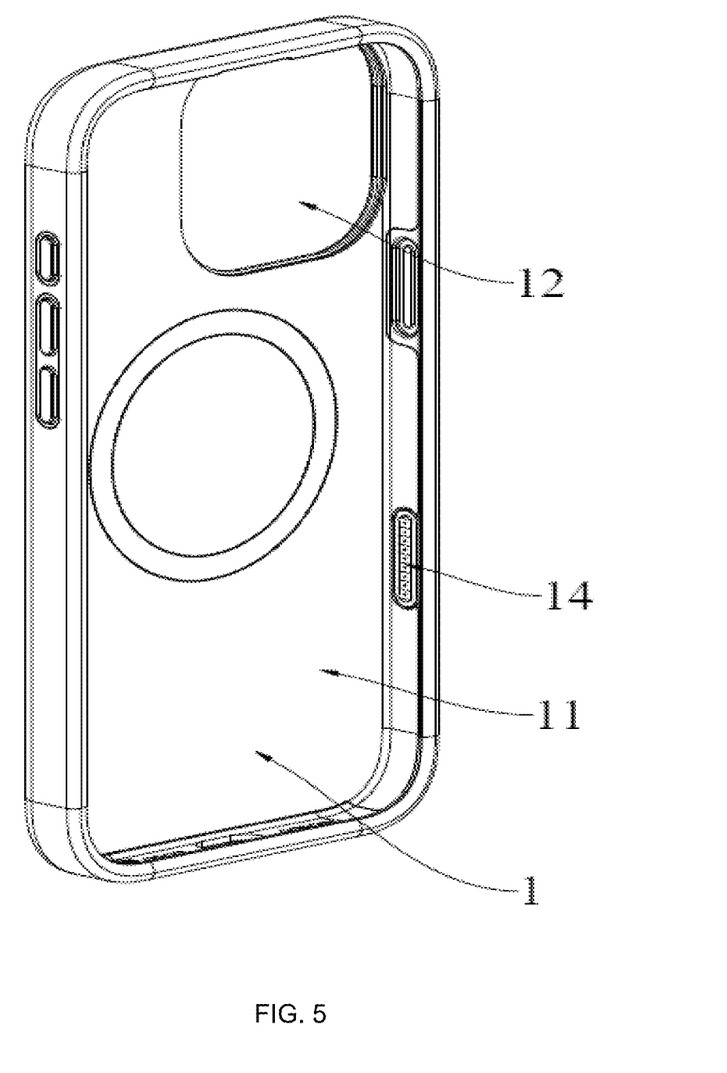
FIG. 5 is a schematic structural diagram of a main body of the mobile phone protective case according to the present invention.

As shown in FIG. 5, the accommodation cavity 11 is provided on one side of the main body 1, and a touch button 14 is provided on a side wall of the accommodation cavity 11. The touch button 14 is electrically connected to the mobile phone TO. When a user's finger touches the touch button 14, a corresponding operation can be performed on the mobile phone TO.

The support of the mobile phone protective case needs to be opened and closed frequently, which is easily damaged during use. Replacing the entire mobile phone protective case requires excessively high use costs. Therefore, the costs are reduced by replacing the camera support assembly. To facilitate installation and removal of the camera support assembly, a raised strip 13 is disposed on a side wall of the camera hole 12, and a groove 21 is provided at a corresponding position on a side wall of the installation base 2. When the installation base 2 is installed, the raised strip 13 is clamped with the groove 21. To improve the stability of the installation base 2, the raised strip 13 and the groove 21 are disposed in annular shapes. The raised strip 13 is disposed around the camera hole 12, and the groove 21 is disposed around the installation base 2. When the camera support assembly is removed, the installation base 2 is pulled upward to separate the raised strip 13 from the groove 21, and then the installation base 2 is separated from the camera hole 12.

Figure 6:
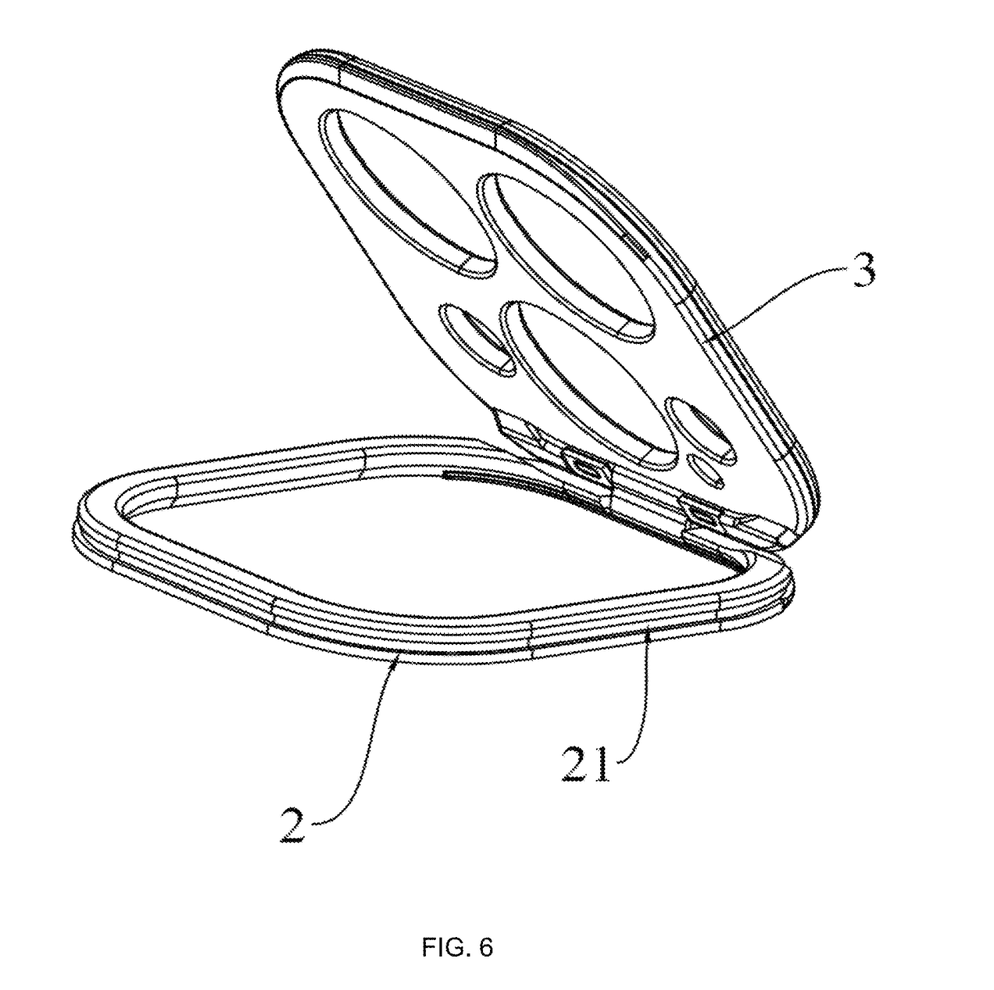
FIG. 6 is a schematic structural diagram of a camera assembly according to the present invention.
Figure 7:
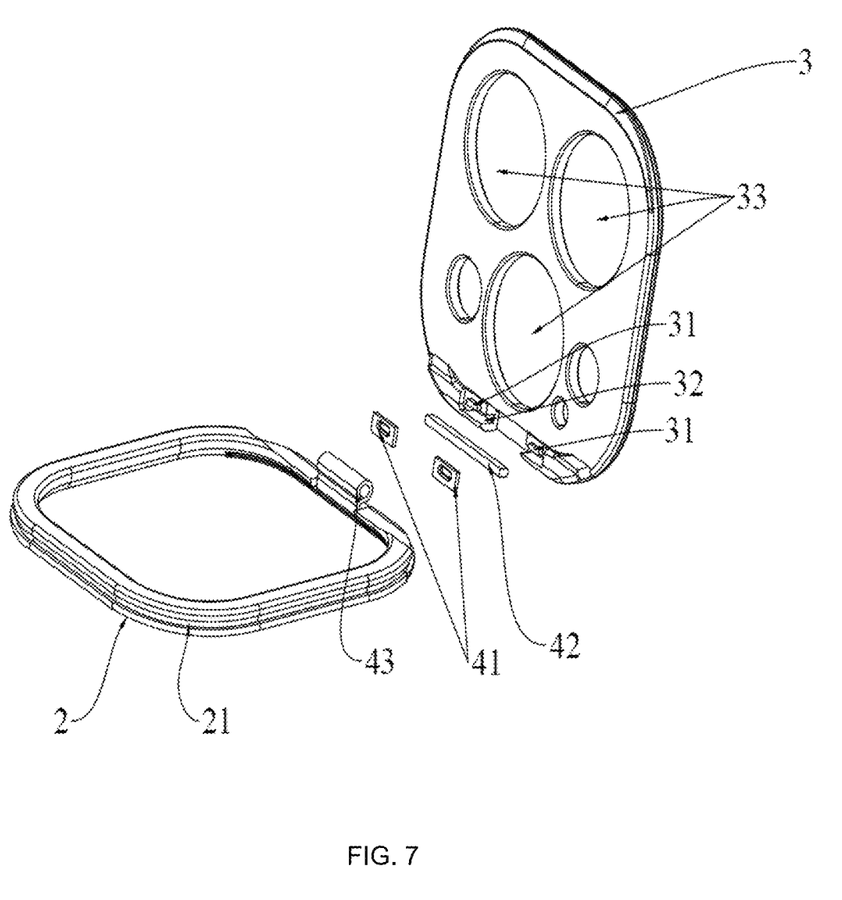
FIG. 7 is a schematic exploded view of the camera assembly according to the present invention.
Figure 8:
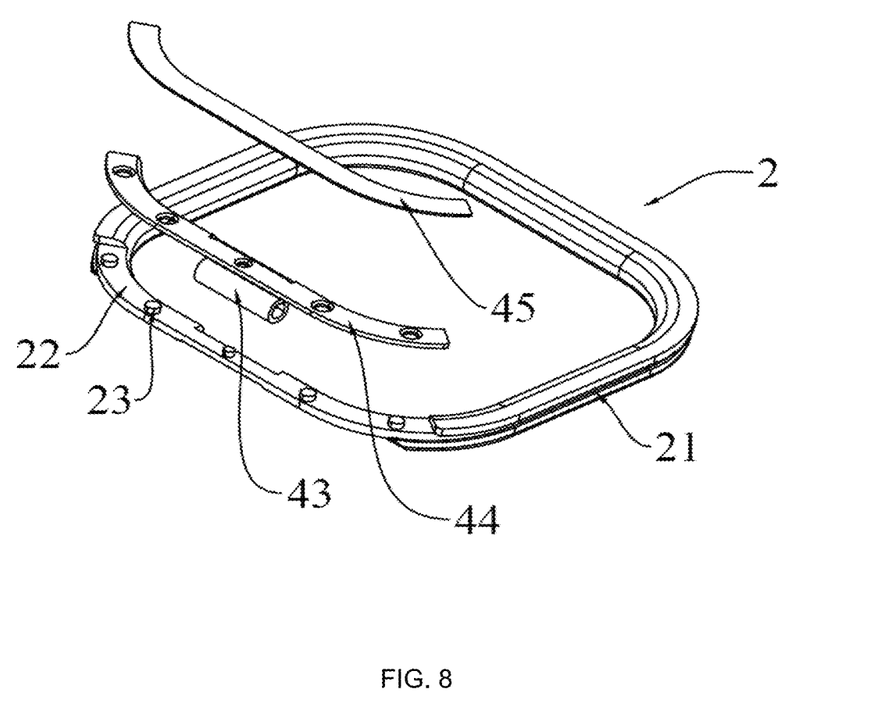
FIG. 8 is a schematic exploded view of an installation base of the camera assembly according to the present invention.

As shown in FIG. 6 to FIG. 8, the camera support assembly includes the installation base 2 and the support 3. The support 3 is rotationally connected to the installation base 2 through the hinge 4. To reduce costs, the installation base 2 and the support 3 are both plastic parts. In order not to interfere with a lens of the camera, a plurality of lens holes 33 are provided in the support 3 for avoiding the camera of the mobile phone TO.

The hinge 4 includes a pressing plate 41, a rotating shaft 42, a sleeve 43, an installation plate 44, and a positioning sheet 45. A slot 32 is provided at an end of the support 3. The slot 32 is used to install the rotating shaft 42. To prevent the rotating shaft 42 from shaking, a cross section of the slot 32 is set to be rectangular. In addition, two flat surfaces are formed by whittling both sides of a circular shaft to obtain the rotating shaft 42. The two flat surfaces of the rotating shaft 42 are clamped with the slot 32. Further, a clamping block 31 is disposed next to the slot 32, and the pressing plate 41 is disposed above the rotating shaft 42. An opening corresponding to a shape of the clamping block 31 is provided in the middle of the pressing plate 41. When the pressing plate 41 and the rotating shaft 42 are installed, the rotating shaft 42 is installed in the slot 32 after the clamping block 31 is clamped with the opening of the pressing plate 41. There are two pressing plates 41 and two clamping blocks 31, and the two pressing plates 41 are disposed at two ends of the rotating shaft 42.

The sleeve 43 is disposed on the installation base 2 and is rotationally connected to the rotating shaft 42. To install the sleeve 43, the sleeve 43 and the installation plate 44 are integrally formed. A step 22 is disposed at an end of the installation base 2, and the installation plate 44 is installed on the step 22. To fasten the installation plate 44, a plurality of pins 23 are disposed on a surface of the step 22, and a plurality of pin holes are provided at corresponding positions of the installation plate 44. When the installation plate 44 is connected to the installation base 2, the pins 23 fit into the pin holes. To prevent the installation plate 44 from falling, the positioning sheet 45 is also installed on a lower surface of the installation plate 44. The positioning sheet 45 may be fastened to the lower surface of the installation plate 44 by bonding, welding, or screw connection. To prevent the positioning sheet 45 from interfering with the mobile phone TO, the lower surface of the positioning sheet 45 is set to be flush with a lower surface of the installation base 2.

Through movable connection between the pressing plate 41 and the clamping block 31, the rotating shaft 42 is easily connected to the support 3, then the rotating shaft 42 is easily inserted into the sleeve 43, and finally the camera support assembly with the installation base 2 and the support 3 that are easily assembled is obtained. When using the mobile phone protective case, the user can purchase a plurality of camera support assemblies. When the installation base 2 or support 3 is damaged, a corresponding part can be replaced as needed without replacement of the entire camera support assembly. Such setting further reduces use costs for the user.

It should be noted that in this specification, relationship terms such as "first" and "second" are merely used to distinguish one entity or operation from another, and do not necessarily require or imply that any actual relationship or sequence exists between these entities or operations. Content not described in detail in the specification belongs to the prior art known to those skilled in the art.

The above description is only preferred embodiments of the present invention and does not limit the present invention in any form. Any person of ordinary skill in the industry can smoothly implement the present invention as shown in the accompanying drawings and the above description. However, any slight changes, modifications, and equivalent changes made by those skilled in the art by utilizing the technical content disclosed above without departing from the scope of the technical solution of the present invention are all equivalent embodiments of the present invention. In addition, any equivalent changes, modifications, and evolutions made to the above embodiments based on the essential technology of the present invention still fall within the protection scope of the technical solution of the present invention.

The invention claimed is:

1. A mobile phone protective case with a rotating support, wherein the protective case comprises a main body and a camera support assembly, the main body is provided with an accommodation cavity for accommodating a mobile phone, and a camera hole is provided in the main body corresponding to a camera of the mobile phone, wherein
the camera support assembly is removably installed at the camera hole, the camera support assembly comprises an installation base and a support, the support is rotationally connected to the installation base through a hinge, the support is configured to protect the camera of the mobile phone when closed, and the support is configured to support the mobile phone when opened; and
the hinge comprises a pressing plate, a rotating shaft, and a sleeve, a slot is provided at one end of the support, a clamping block is disposed next to the slot, and the rotating shaft is installed in the slot after the clamping block is clamped with an opening of the pressing plate; and the sleeve is disposed on the installation base and is rotationally connected to the rotating shaft;
wherein a step is disposed at an end of the installation base; and the hinge further comprises an installation plate, the sleeve and the installation plate are integrally formed, and the installation plate is installed on the step.

2. The mobile phone protective case with a rotating support according to claim 1, wherein a plurality of pins are disposed on a surface of the step, a plurality of pin holes are provided at corresponding positions of the installation plate, and the pins fit into the pin holes; and a positioning sheet is also installed on a lower surface of the installation plate, and a lower surface of the positioning sheet is flush with a lower surface of the installation plate.

3. The mobile phone protective case with a rotating support according to claim 2, wherein the positioning sheet is pasted on and fastened to the lower surface of the installation plate.

4. The mobile phone protective case with a rotating support according to claim 1, wherein a raised strip is disposed on a side wall of the camera hole, a groove is provided at a corresponding position on a side wall of the installation base, and the raised strip is clamped with the groove.

5. The mobile phone protective case with a rotating support according to claim 4, wherein the raised strip and the groove are disposed in annular shapes, the raised strip is disposed around the camera hole, and the groove is disposed around the installation base.

6. The mobile phone protective case with a rotating support according to claim 1, wherein a plurality of lens holes are provided in the support for avoiding the camera of the mobile phone.

7. The mobile phone protective case with a rotating support according to claim 2, wherein there are two pressing plates and two clamping blocks, and the two pressing plates are disposed at two ends of the rotating shaft.

8. The mobile phone protective case with a rotating support according to claim 2, wherein the installation base and the support are both plastic parts.

9. The mobile phone protective case with a rotating support according to claim 1, wherein a touch button is provided on a side wall of the accommodation cavity, and the touch button is electrically connected to the mobile phone.

* * * * *